(12) United States Patent
Sun

(10) Patent No.: US 8,139,938 B2
(45) Date of Patent: Mar. 20, 2012

(54) HIERARCHICAL ROUTING QUERY METHOD OF AUTOMATIC SWITCHED OPTICAL NETWORK

(75) Inventor: Desheng Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 470 days.

(21) Appl. No.: 12/514,470

(22) PCT Filed: Dec. 1, 2006

(86) PCT No.: PCT/CN2006/003250
§ 371 (c)(1),
(2), (4) Date: May 12, 2009

(87) PCT Pub. No.: WO2008/080251
PCT Pub. Date: Jul. 10, 2008

(65) Prior Publication Data
US 2010/0061724 A1  Mar. 11, 2010

(51) Int. Cl.
*H04J 14/00* (2006.01)
(52) U.S. Cl. ............... 398/49; 398/48; 398/45; 398/57
(58) Field of Classification Search ............ 398/49, 398/48, 45, 57
See application file for complete search history.

(56) References Cited

U.S. PATENT DOCUMENTS

| | | | | |
|---|---|---|---|---|
| 6,026,077 A * | 2/2000 | Iwata | ............ | 370/254 |
| 2004/0184441 A1* | 9/2004 | Wu et al. | ............ | 370/351 |
| 2006/0245413 A1 | 11/2006 | Skalecki et al. | | |
| 2006/0262728 A1* | 11/2006 | Addeo et al. | ............ | 370/248 |

FOREIGN PATENT DOCUMENTS

| | | |
|---|---|---|
| CN | 1529429 A | 9/2004 |
| CN | 1561048 A | 1/2005 |
| EP | 0841824 A2 | 5/1998 |
| EP | 1460808 A2 | 8/2004 |
| EP | 1489784 A1 | 12/2004 |
| EP | 1724972 A1 | 11/2006 |
| EP | 1727316 A1 | 11/2006 |

OTHER PUBLICATIONS

Draft ITU-T Recommendation G 7715/Y 1706: "Architecture and requirements for routing in the automatically switched optical network", ITU-T Draft Study Period 2001-2004, International Telecommunication Union, Geneva, CH, May 21, 2002, pp. 1-32.
Comellas J et al: "PNNI-based control plane for automatically switched optical networks", Journal of Lightwave Technology, IEEE Service Center, New York, NY, vol. 21, No. 11, Nov. 1, 2003, pp. 2673-2682.
Supplemental European Search Report (EPO Form 1502), EP 06 82 8220, Aug. 20, 2010.
International Search Report (PCT/USA/210), PCT/CN2006/003250, Jul. 30, 2007.

* cited by examiner

*Primary Examiner* — Kinam Park
(74) *Attorney, Agent, or Firm* — Thomas, Kayden, Horstemeyer & Risley, LLP

(57) ABSTRACT

A hierarchical route inquiry method in Automatic Switched Optical Network is applied to the networks having multilayer route domains. According to the method, after the route controller RC in one child domain receives the Route Request, if it can not calculate the complete route, it sends the Route Request to the RC in the parent domain; if the RC in the parent domain can not obtain the complete route, it further interacts with other child domains to obtain the complete route and returns the Route Response back to the requester. The present invention solves the problem of creating a cross-domain connection in route inquiry in the Automatic Switched Optical Network.

8 Claims, 3 Drawing Sheets

HIERARCHICAL ROUTING QUERY METHOD OF AUTOMATIC SWITCHED OPTICAL NETWORK

CROSS REFERENCE RELATED APPLICATIONS

This application is a national phase of PCT/CN2006/003250 filed Dec. 1, 2006, which is entirely incorporated herein by reference.

TECHNICAL FIELD

The present invention relates to the field of optical networks, and more specifically to a hierarchical route inquiry method in an automatic switched optical network.

BACKGROUND ART

Optical networks, such as OTN (Optical transmission network), WDM (Wavelength-division multiplexing), SDH (Synchronous digital hierarchy) or SONET (Synchronous optical network), have been widely applied in the telecommunication field.

Recently, the automatic switched optical network (ASON) is one of research hotspots in the field of optical networks. The concept of ASON is offered by ITU-T G.8080, in which the function of ASON is achieved by setting a specific Control Plane (CP). ITU-T G.7713 specifies the framework to implement the distributed calls and connections in ASON to offer the implementation criterion for automatically establishing, modifying and deleting the calls and connections. Standards such as ITU-T G.7715 offer the implementation model and method for the route inquiry of the connection (the route inquiry described in the following will refer to the route inquiry of the connection, unless especially declared).

However, both the published ITU-T G.7715 and ITU-T G.7715.1 apply the model shown in FIG. 1. In this route model, when an ASON network element (NE for short) needs to query the connection route, the Connection Controller (CC) responsible for the connection control (including establishment, deletion, modification, and so on) sends the route inquiry request (Route Request for short) to the Route Controller (RC) responsible for the route inquiry and calculation, and then the RC calls a routing algorithm (a typical routing algorithm is Constrained Shortest Path First, shortly CSPF) according to the Route Request and calculates the route based on the Route Data Base (RDB) of the current node and returns the route inquiry result (Route Response for short) to the CC.

However, the RDB of a node generally is hard to have the complete route information of the whole ASON, especially when the ASON has several route domains. The RDB of one node always has only the information of local route domain. FIG. 2 shows the situation when one ASON has several route domains, which shows that when a connection should be established between A in route domain 1 and K in the route domain 4, as shown by the dot line, the model shown in FIG. 1 can not meet the requirement of the route inquiry and calculation of the connection.

SUMMARY OF THE INVENTION

The technical problem to be solved by the present invention is to offer a method of hierarchical route inquiry in ASON to solve the problem of route inquiry in cross-domain connection.

In order to solve the above technical problem, the present invention offers a method of hierarchical route inquiry in ASON, which is applied in the network that comprises multi-layer route domains. In the method, when the RC of a child domain receives the Route Request, it sends the Route Request to the RC of the parent domain if it can not calculate a complete route, and the RC of the parent domain further interacts with other child domains to obtain the complete route if it can not calculate a complete route, and then sends the Route Response to the requester.

Furthermore, the above method may also have the following feature: the method further comprises the following steps:

(a1) After the RC of a NE in ASON detects the Route Request from the requester, it forwards the Route Request to the RC of the parent domain if the Request is a cross-domain Route Request;

(a2) The RC of the parent domain calculates the route among all its child domains and sends an in-domain Route Request to the RC of each child domain on the route, the RC of each child domain calculates the route in its own domain and returns the Route Response to the RC of the parent domain which, after receiving the Route Response, returns the route to the requester through the RC which launches the Route request if a complete route can be obtained through combination, otherwise a failure message is returned.

Furthermore, the above method may have the following feature: the step (a2) further comprises the following steps:

(a21) The RC of the parent domain calculates the route among its child domains, determines the boundary node of each child domain on the route, and then generates and broadcasts the in-domain Route Request including the information of boundary node of the corresponding child domain;

(a22) After the child domains receive the in-domain Route Request, it calculates the route of its domain and returns the Route Response of its own domain to the RC of the parent domain;

(a23) After the RC of the parent domain receives the Route Responses from the child domains, it determines whether all results are successful, if yes, then proceed to the next step; otherwise, a failure message is returned to the requester through the RC which launches the request, ending;

(a24) The RC of the parent domain combines the cross-domain route and the in-domain route of each child domain to generate the complete route between the start and the end, and returns the complete routing to the requester through the RC which launches the Request, ending.

Furthermore, the above method may also have the following features: if the parent domain fails to calculate the cross-domain route in step (a2), then a failure message is returned to the requester through the RC which launches the Request, ending.

Furthermore, the above method may also have the following feature: the method further comprises the following steps:

(b1) After the RC of the NE in ASON detects the Route Request sent by the requester, it calculates the route based on the RDB of the current node, and returns the Route Response to the requester if a complete route is obtained, ending; otherwise, it forwards the Request to the RC of the parent domain;

(b2) The RC of the parent domain calculates the route based on the RDB of current node according to the Request, and if the complete route is obtained, it is returned to the requester through the RC which launches the Request, ending; otherwise, proceeding to the next step;

(b3) The RC of the parent domain forwards the Route Request to the RC of its other child domains, and after it receives the Route Responses from the RCs of these child domains, it returns the route to the requester through the RC which launches the Request if it obtains the complete route, otherwise, a failure message is returned to the requester through the RC which launches the Request, ending.

Furthermore, the above method may also have the following feature: the step (b3) further comprises the following steps:

(b31) The RC of the parent domain sends the Route Request to the RC of one of its other child domains other than the RC which launches the Request;

(b32) After the RC of the other child domain receives the Route Request, it calculates the route based on the RDB of the current node and returns the Route Response to the RC of the parent domain;

(b33) The RC of the parent domain determines whether the Route Response returned from the RC of the child domain is the complete route, if yes, the route is returned to the requester through the RC which launches the Request, ending; otherwise, proceeding to the next step;

(b34) The RC of the parent domain determines whether there is a RC of other child domain that has not been queried, if there is, the Route Request is further forwarded to the RC of another child domain, and turning to step (b32); otherwise, a failure message is returned to the requester through the RC which launches the request, ending.

Furthermore, the above method may also have the following feature: the step (b3) further comprises the following steps:

(b31) The RC of the parent domain broadcasts the Route Request to the RCs of all other child domains but the one which launches the Request;

(b32) After the RCs of all other child domains receive the Route Request, they calculate the route based on the RDB of their current nodes and return the Route Responses to the RC of the parent domain;

(b33) The RC of the parent domain determines whether there is a complete route in the Route Responses returned from the RCs of the child domains, if yes, the route is returned to the Requester through the RC which launches the Request, ending.

Furthermore, the above method may also have the following feature: when the RC of the parent domain sends the Route Request to the RC of the child domain, the Route Request is sent to the RC of the representative NE which represents the child domain to interact with the upper-layer route domain.

Based on the hierarchical route model suggested by the ITU-T G.8080, the method of the present invention realizes the route inquiry, which can not be accomplished by the NE in the local route domain, through the interaction of the RCs of different hierarchical route domains, easy and reliable.

DESCRIPTION OF THE PREFERRED EMBODIMENTS

Figure 1:
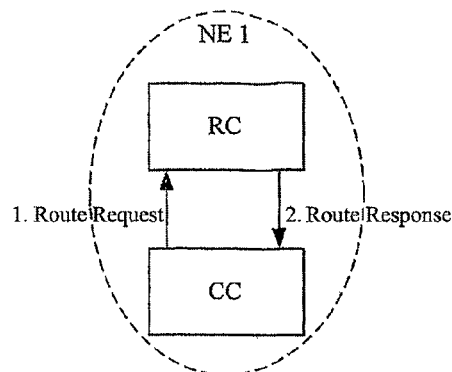
FIG. 1 is an illustration of the route inquiry by a single NE.

Based on the prior art, the present invention offers an implementation strategy to solve the problem that route inquiry can not be performed by the RC of NEs in the single route domain.

The key of the present invention is to implement the route inquiry through the interaction between the RCs of the related NEs of ASON in the related parent domain and the child domains based on hierarchical route model. In the present invention, according to manual configuration or other methods, the RC of each route domain can obtain the information about the RC of the upper-layer domain (the parent domain in short. With respect to the parent domain, the other route domains are called the child domains).

One method is: the RC of each child domain is responsible for calculating the route in its domain, and the cross-domain route can be calculated by sending the Route Request to the RC working in the parent domain, and the RC of the parent domain can further use the Route Request to request the route across the other child domains.

Another method is: when the route inquiry should be performed, the RC of the local route domain calls the routing algorithm according to the Request to calculate the route based on the RDB of the current node. If the calculation fails, the RC forwards the Request to the RC of the upper-layer domain, and the route inquiry is accomplished by the RC of the parent domain or by the interaction between the RC of the parent domain and the RCs of the other child domains.

The present invention does not define the in-domain route inquiry. In the following, the present invention will be described in further detail with reference to the accompanying figures and three embodiments.

The First Embodiment

The method of the hierarchical route inquiry in accordance with present embodiment includes the following steps:

Step 1: the RC of the NE in the local route domain detects and receives a Route Request, then proceeding to the next step;

The Route Request includes the information of the starting node and the ending node.

Step 2: according to the Route Request, the RC calls the routing algorithm, such as CSPF, to calculate the route based on the RDB of the current node, and if the complete route is obtained, the calculated route is returned to the requester (such as CC), ending; otherwise, the Route Request is forwarded to the RC of the parent domain, and proceeding to the next step;

Step 3: according to the Route Request, the RC of the parent domain calls the routing algorithm to calculate the route based on the RDB of the current node, and if the complete route is obtained, the route is returned to the requester, ending; otherwise, the Route Request is forwarded to the RC of one of its other child domains other than the RC which launches the request, and proceeding to the next step;

Generally, the RC of the parent domain forwards the Request to the RC of the representative NE in other child domains, and the representative NE is always called as SPEAKER in standards and represents the child domain to interact with the upper-layer route domain, and the RC of the representative NE has the information of the upper-layer route domain. All representative NEs constitute the upper-layer route domain.

Step 4: according to the received Route Request, the RC of the other child domain calls the routing algorithm to calculate the route based on the RDB of the current node, and returns the Route Response to the RC of the parent domain;

Step 5: the RC of the parent domain determines whether the Route Response returned from the RC of the child domains is the complete route, if yes, the complete route is returned to the requester which launches the Route Request, ending; otherwise, proceeding to the next step;

Step 6: the RC of the parent domain determines whether there is still a RC of other child domains that has not been inquired, if there is, the Route Request is forwarded to the RC of one of the other child domains, and turning to step 4; if the RCs of all child domains has performed the route inquiry and there is no proper result, a failure message is returned to the requester which launches the Request, ending.

Figure 2:
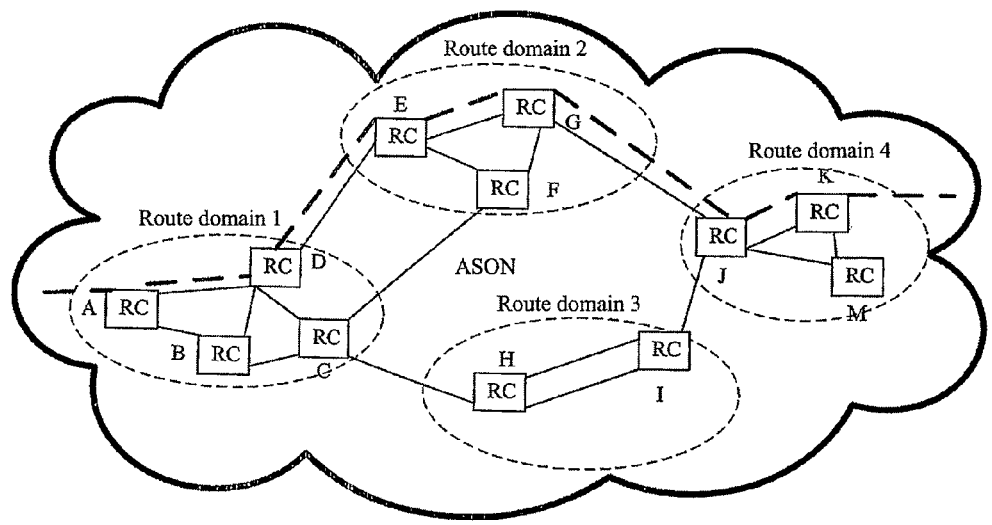
FIG. 2 is an illustration of an ASON having several route domains.
Figure 3:
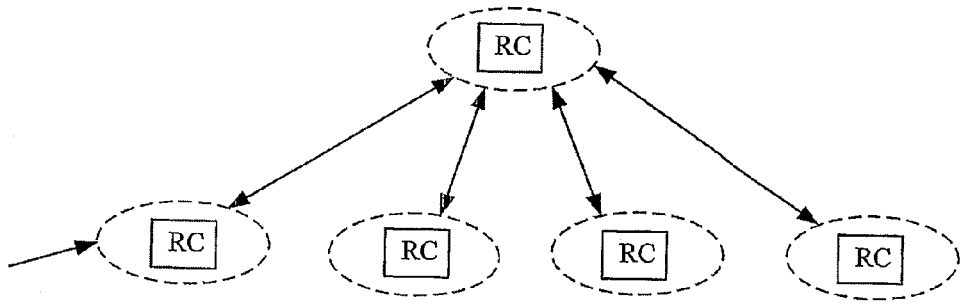
FIG. 3 shows a model of RC interaction according to the method of the hierarchical route domain applied in the present invention.
Figure 4:
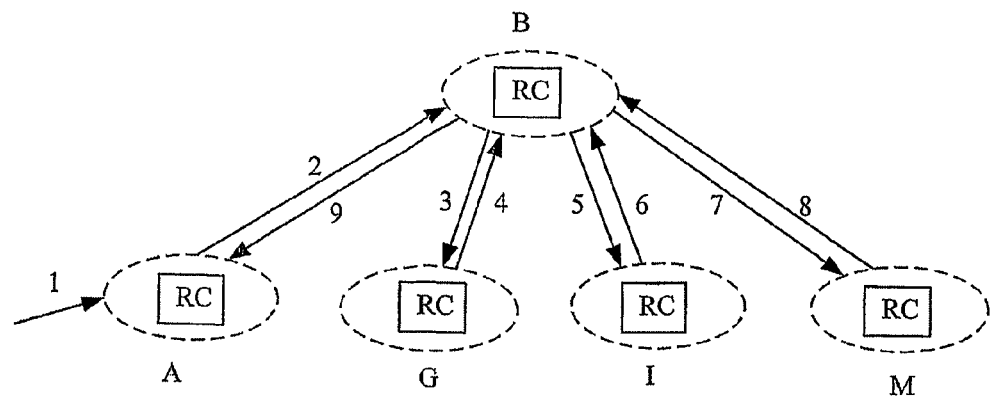
FIG. 4 is an illustration of the process of the RC interaction in accordance with the first embodiment of the present invention.
Figure 5:
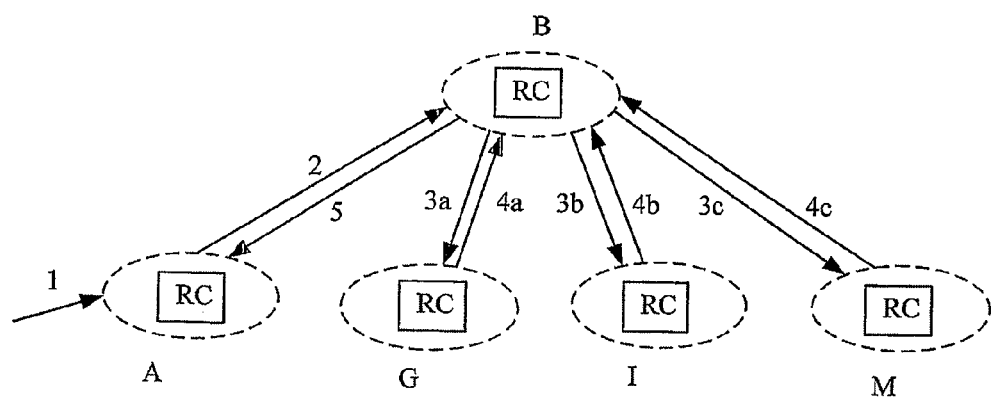
FIG. 5 is an illustration of the process of the RC interaction in accordance with the second embodiment of the present invention.
Figure 6:
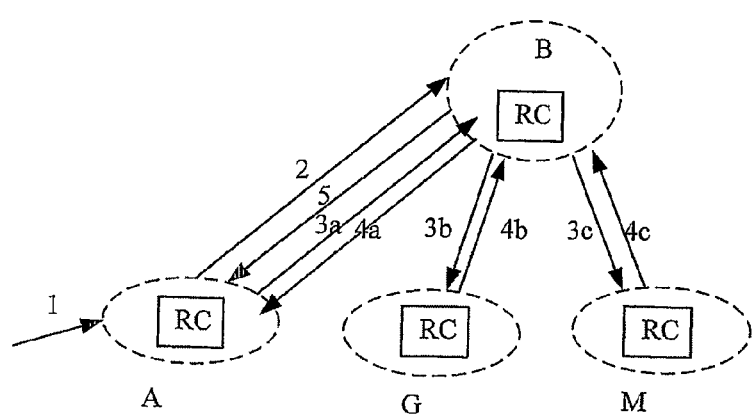
FIG. 6 is an illustration of the process of the RC interaction in accordance with the third embodiment of the present invention.

The embodiment 1 will be described-below in detail by combining FIG. 1, FIG. 2, FIG. 3, FIG. 4 and FIG. 7, taking the route shown with the dot line in FIG. 2 needs to be queried as an example. The ASON NE A in the route domain 1 only has the information of the route domain 1, the ASON NE B is the representative NE for the route domain 1, while the ASON NE G for the route domain 2, the ASON NE I for the route domain 3, the ASON NE M for the route domain 4.

The specific steps are as follows:

Step 1: The RC of the each ASON NE in the route domains 1, 2, 3 and 4 checks the Route Request. The RC of the NE A in the route domain 1 receives the Route Request, and the starting node is A and the ending node is K, and proceeding to the next step;

Step 2, the RC of the NE A calls the routing algorithm according to the Route Request to calculate the route based on the RDB of the current node, and if the complete route can not be obtained since the information in the RDB of the NE A is not enough, the RC will forward the Route Request to the RC of the parent domain, that is, the RC of the NE B, and proceeding to the next step;

Step 3: the RC of the NE B calls the routing algorithm according to the Route Request to calculate the route based on the RDB of the current node, and if the complete route is obtained, the Route Response is returned to the RC of the NE A, ending. Otherwise, the Route Request is forwarded to the RC of the NE G in the route domain 2;

Step 4: the RC of the NE G calls the routing algorithm according to the received Route Request to calculate the route based on the RDB of the current node, and if the complete route is obtained, the Route Response is returned to the RC of the NE B, ending. Otherwise, a failure message is returned to the RC of the NE B;

Step 5, according to the result returned from the RC of the NE G, the RC of B returns the result to the RC of the A if the route is complete, ending; Otherwise, the Request is forwarded to the RC of the NE I in the route domain 3, and repeating the step 4 and step 5. If all child domains, including the route domains 2, 3 and 4, have been queried, yet there is no proper result, then the RC of B returns a failure message to the RC of A, ending.

Figure 7:
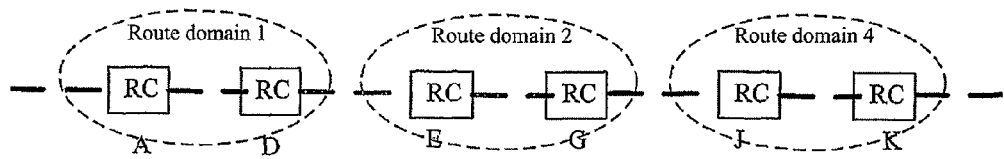
FIG. 7 is an illustration of the final Route Response in accordance with the present invention, based on the network shown in FIG. 2.

If the inquiry is successful, the route should be shown as FIG. 7.

The Second Embodiment

The implementation of the second embodiment can be obtained by partially modifying the related steps of the first embodiment, and the second embodiment includes the following steps:

Step 1: after the RC of the related ASON NE in the local route domain detects and receives a Route Request, proceeding to the next step;

Step 2: according to the Route Request, the RC calls the routing algorithm to calculate the route based on the RDB of the current node, and if the complete route is obtained, the route is returned to the requester, ending; otherwise, the Route Request is forwarded to the RC of the parent domain, and proceeding to the next step;

Step 3: according to the Route Request, the RC of the parent domain calls the routing algorithm to calculate the route based on the RDB of the NE, and if the complete route is obtained, the route is returned to the requester through the RC which launches the Request, ending; otherwise, the Route Request is broadcasted to the RCs of all other child domains (typically the RCs of the representative NEs) except the one which launches the request, and proceeding to the next step;

Step 4: according to the received Route Request, the RCs of all other child domains call the routing algorithm to calculate the route based on the RDBs of their current nodes, and return the Route Responses to the RC of the parent domain;

Step 5: if the RC of the parent domain receives the complete route returned from the RC of one or more child domains, the RC of the parent domain selects one (if only one RC returns the complete route, there is no need for selection) and returns it to the requester which launches the Request, ending; otherwise, a failure message is returned to the requester, ending.

The second embodiment will be described-below in detail by combining FIG. 1, FIG. 2, FIG. 3, FIG. 5 and FIG. 7 and taking the route shown as the dot line in FIG. 2 needed to be queried as an example. The second embodiment is based on the same network as the first embodiment.

The specific steps are as follows:

Step 1: the RC of each NE in the route domains 1, 2, 3 and 4 detects the Route Request. The RC of the ASON NE A in the route domain 1 receives the Route Request, the starting node is A and the ending node is K, and proceeding to the next step;

Step 2, the RC of the NE A calls the routing algorithm according to the Route Request to calculate the route based on the RDB of the current node, and if the complete route can not be obtained since the information in the RDB of the NE A is not enough, the RC will forward the Route Request to the RC of the parent domain, that is, the RC of the NE B, and proceeding to the next step;

Step 3: the RC of the NE B calls the routing algorithm according to the Route Request and calculates the route based on the RDB of the current node, and if the complete route is obtained, the Route Response is returned to the RC of the NE A, ending. Otherwise, the Route Request is broadcasted to the RC of the NE G in the route domain 2, the RC of the NE I in the route domain 3, and the RC of the NE M in the route domain 4;

Step 4: if the RC of B receives the complete route from the RC of one or more child domains, the RC of B selects one of them (if there is only one, then there is no need for selection) and returns it to the RC which launches the Request. If there is no complete route returned from route domains 2, 3, 4, a failure message is returned to the RC of A, ending.

Compared with the example of the first embodiment, in the second embodiment, the RC of the parent domain applies the parallel mechanism in step 4, that is, the Route Request is simultaneously sent to the RC of each child domain. The route successfully queried in this embodiment is shown as FIG. 7.

The Third Embodiment

The hierarchical route inquiry method of the present embodiment is a segmental inquiry which includes the following steps:

Step 1: the RC of the related ASON NE in the local route domain detects and receives a Route Request, proceeding to the next step;

Step 2: the RC determines whether it is a cross-domain inquiry request, if no, according to the Request, the RC calls the routing algorithm to calculate the route based on the RDB of the current node, and the complete route is returned to the requester, ending; otherwise, the Route Request is forwarded to the RC of the parent domain, and proceeding to the next step;

Step 3: according to the Request, the RC of the parent domain calls the routing algorithm to calculate the route based on the RDB of the current node, and if the complete route is obtained, then the boundary node of each child domain on the route (that is, the information of the starting node and ending node of the in-domain route inquiry) is determined to generate the in-domain Route Request of the child domains including the information of the starting node and the ending node of the corresponding child domains and forwards the Request to the RC of these child domains, which are always the RCs of the representative NEs, and proceeding to the next step; otherwise, a failure message is returned to the requester through the RC which launches the request, ending;

The RC of the parent domain generally is configured with the route information among each child domain, that is, each child domain is treated as a network element to calculate.

Step 4: after each child domain receives the Route Request, it calls the routing algorithm to calculate the route based on the RDB of the current node, and returns the Route Response to the RC of the parent domain;

Step 5: if the RC of the parent domain receives the Route Response from the child domains and the route calculation by each child domain is successful, then the RC of the parent domain combines the locally calculated route between the child domains to generate a complete route from the starting node to the ending node, and the route is returned to the requester through the RC which launches the Request, ending; If the route calculation by any child domain fails, a failure message is returned to the requester through the RC which launches the Request, ending.

The third embodiment will be described-below in further detail by combining FIG. 1, FIG. 2, FIG. 3, FIG. 6, FIG. 7, FIG. 8, FIG. 9, FIG. 10 and FIG. 11, taking the route shown as the dot line of FIG. 2 needed to be queried as an example. The third embodiment is based on the same network as the above two embodiments.

Figure 8:
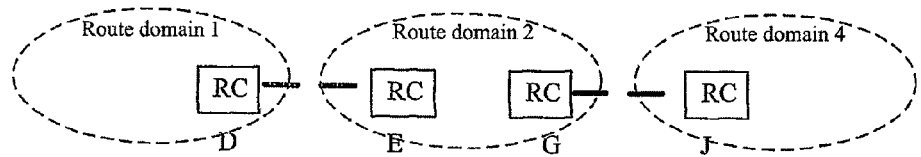
FIG. 8 is an illustration of the RC of the parent domain calculating the cross-domain route in accordance with the third embodiment of the present invention, based on the network shown in FIG. 2.
Figure 9:
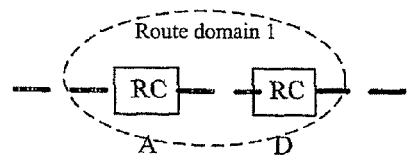
FIG. 9 is an illustration of the related RC of the child domain 1 calculating the in-domain route in accordance with the third embodiment of the present invention, based on the network shown in FIG. 2.
Figure 10:
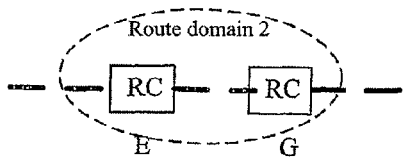
FIG. 10 is an illustration of the related RC of the child domain 2 calculating the in-domain route in accordance with the third embodiment of the present invention, based on the network shown in FIG. 2.
Figure 11:
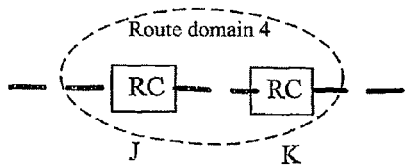
FIG. 11 is an illustration of the related RC of the child domain 4 calculating the in-domain route in accordance with the third embodiment of the present invention, based on the network shown in FIG. 2.

The specific steps are as follows:

Step 1: the RC of each ASON NE in the route domains 1, 2, 3 and 4 checks the Route Request. The RC of the NE A in the route domain 1 receives the Route Request, and the starting node is A and the ending node is K, and proceeding to the next step;

Step 2, the RC of the NE A determines that the Request is a cross-domain Route Request and forwards the Route Request to the RC of the parent domain, that is, the RC of the NE B, and proceeding to the next step;

Step 3: the RC of the NE B calls the routing algorithm according to the Route Request to calculate the route between the route domains 1,2,4 based on the RDB of the current node, and the route result is shown as FIG. 8, which determines the boundaries for the child domains 1, 2 and 4, and then the RC of B generates the in-domain Route Request of the child domains 1, 2, and 4, and broadcast the Request to the NE A in the child domain 1, the NE G in the child domain 2 and the NE M in the child domain 4;

Step 4: the RCs of the NE A in the child domain 1, NE G in the child domain 2 and NE M in the child domain 4 call the routing algorithm according to the Route Request to calculate the route based on the RDBs of their current nodes, and the route results are respectively shown as in FIGS. 9, 10 and 11, and the result is returned to the RC of the NE B.

Step 5: the RC of B receives the route results from each child domains 1, 2 and 4, as shown in FIGS. 9, 10 and 11. If the route calculation by the child domains 1, 2 and 4 is successful, then by combining the result shown in FIG. 8 calculated by step 3, the RC of B generates the complete route shown as FIG. 7, and returns the result to the RC of A which launches the Request, ending.

Of course, the present invention may have many other embodiments. Therefore, without departing from the spirit and essence of the present invention, those skilled in the field can make various corresponding modifications or variations which will fall into the protection scope of the claims of the present invention.

INDUSTRIAL APPLICABILITY

Based on the model of hierarchical route suggested by ITU-T G.8080, the present invention performs the route inquiry, especially cross-domain route inquiry by the interaction between the RC of the parent domain and the RC of the related NE in each child domain, easy and reliable.

I claim:

1. A hierarchical route inquiry method in Automatic Switched Optical Network (ASON) used in a network comprising multi-layer route domains, comprising the following steps:

(a1) A Route Controller (RC) of an ASON network element (NE) detects a Route Request launched by a requester, and then forwards the Route Request to a RC of a parent domain if the Route Request is a cross-domain Route Request;

(a2) The RC of the parent domain calculates a route among all its child domains and sends an in-domain Route Request to the RC of each child domain on the route, the RC of each child domain calculates the route in its domain and returns a Route Response to the RC of the parent domain, after receiving the Route Response, the RC of the parent domain returns the route to the requester through the RC which launches the Route Request if the complete route can be obtained, otherwise a failure message is returned.

2. A method of claim 1, wherein step (a2) further comprises the following steps:
- (a21) The RC of the parent domain calculates the route among its child domains, determines a boundary node of each child domain on the route, and then generates and broadcasts the in-domain Route Request including information of the boundary node corresponding to each domain to the child domains;
- (a22) After the child domains receive the in-domain Route Request, it calculates the route of its domain and returns the Route Response to the RC of the parent domain;
- (a23) After the RC of the parent domain receives the Route Responses from the child domains, it determines whether all of the Route Responses are successful, if yes, proceeding to the next step; otherwise, a failure message is returned to the requester through the RC which launches the request, ending;
- (a24) The RC of the parent domain combines the cross-domain route and the in-domain route of the child domains to generate the complete route between a starting node and an ending node, and returns the complete route to the requester through the RC which launches the Request, ending.

3. A method of claim 1, wherein if the parent domain fails to calculate the cross-domain route in step (a1), the failure message is returned to the requester through the RC which launches the Request, ending.

4. A hierarchical route inquiry method in Automatic Switched Optical Network (ASON) used in a network comprising multi-layer route domains, comprising the following steps:
- (b1) After a Route Controller (RC) of a network element (NE) in ASON detects a Route Request sent by a requester, the RC of the NE in ASON calculates a route based on Route Data Base (RDB) of a current node, and returns a Route Response to the requester if a complete route is obtained, ending; otherwise, the Request is forwarded to a RC of the parent domain;
- (b2) The RC of the parent domain calculates the route based on the RDB of the current node according to the Request, and if the complete route is obtained, the complete route is returned to the requester through the RC which launches the Request, ending; otherwise, proceeding to the next step;
- (b3) The RC of the parent domain forwards the Route Request to the RCs of its other child domains, and receiving the Route Responses returned from the RCs of these child domains, if a complete route can be obtained, the complete route is returned to the requester through the RC which launches the Request; otherwise, the failure message is returned to the requester through the RC which launches the Request, ending.

5. A method of claim 4, wherein step (b3) further comprises the following steps:
- (b31) The RC of the parent domain sends the Route Request to the RC of one child domain except for the one which launches the Request;
- (b32) After the RC of the child domain receives the Route Request, it calculates the route based on the RDB of the current node and returns the Route Response to the RC of the parent domain;
- (b33) The RC of the parent domain determines whether the Route Response returned from the RC of the child domain is the complete route, if yes, the route is returned to the requester through the RC which launches the Request, ending; otherwise proceeding to the next step;
- (b34) The RC of the parent domain determines whether there is a RC of another child domain that has not been queried, if there is, the Route Request is forwarded to the RC of this child domain, and turning to step (b32); otherwise, the failure message is returned to the requester through the RC which launches the request, ending.

6. A method of claim 4, wherein step (b3) further comprises the following steps:
- (b31) The RC of the parent domain broadcasts the Route Request to the RCs of all other child domains except the one which launches the Request;
- (b32) After the RCs of all other child domains receive the Route Request, they calculate the route based on the RDBs of the current nodes and return the Route Responses to the RC of the parent domain;
- (b33) The RC of the parent domain determines whether there is the complete route in the Route Responses returned from the RCs of the child domains, if yes, the route is returned to the requester through the RC which launches the Request, ending; otherwise, the failure message is returned to the requester through the RC which launches the Request, ending.

7. A method of claim 1, wherein when the RC of the parent domain sends the Route Request to the RC of the child domain, the Route Request is sent to the RC of a representative NE which represents the child domain to interact with an upper-layer route domain.

8. A method of claim 4, wherein when the RC of the parent domain sends the Route Request to the RC of the child domain, the Route Request is sent to the RC of a representative NE which represents the child domain to interact with an upper-layer route domain.

* * * * *